S. A. SMITH.
PACKING.
APPLICATION FILED NOV. 24, 1920.

1,411,197.

Patented Mar. 28, 1922.

Inventor:
Schuyler A. Smith,
By Delos G. Haynes
Atty.

UNITED STATES PATENT OFFICE.

SCHUYLER A. SMITH, OF EAST ST. LOUIS, ILLINOIS.

PACKING.

1,411,197.  Specification of Letters Patent.  Patented Mar. 28, 1922.

Application filed November 24, 1920. Serial No. 426,283.

*To all whom it may concern:*

Be it known that I, SCHUYLER A. SMITH, a citizen of the United States, and a resident of East St. Louis, Illinois, have invented an Improvement in Packing, of which the following is a specification.

This invention relates to packing and mounting therefor, and with regard to certain more specific features, to packing for use in steam engines, air pumps and the like.

Among the several objects of the invention may be noted the provision of simple and inexpensive packing, readily applied and easily replaced; the provision of a simple and durable mounting for the packing; and the provision of compact and effective packing construction, adapted to give efficient service through a long period of use. Other objects will be in part obvious and in part pointed out hereinafter.

The invention accordingly comprises the features of construction, combinations of elements, and arrangements of parts, which are exemplified in the constructions hereinafter described and the scope of the application of which will be indicated in the following claims.

In the accompanying drawings, in which is shown one of various possible embodiments of this invention, Fig. 1 is a central section, showing one embodiment of the invention;

Similar reference characters indicate corresponding parts throughout the several views of the drawings.

Figure 1:
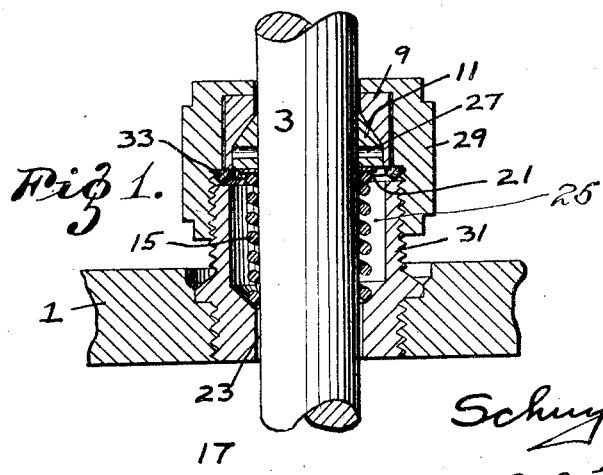

Referring now more particularly to Fig. 1 of the accompanying drawings, there is illustrated at 1 a cylinder head through which passes a piston rod 3.

Attached to the cylinder head by suitable means such as an annular member 31 is a box 7 recessed to receive a cup 9 through which the piston rod passes. Within this cup is packing material 11, preferably in the form of two halves or units 13 (Figs. 2, 3, and 4), which are pressed into the tapering base of the cup by the compression spring 15, assisted by the force of the fluid within the cylinder 17 when such fluid is under compression. The spring, as shown in Fig. 1, is seated between a recess in the annular member 31, and a collar 21 bearing against the packing material 11. Steam or other fluid from within the cylinder 17 can pass through the annular space 23 between cylinder head and piston rod, thence into the chamber 25 in which the spring is housed, and can thus exert pressure tending to force the collar 21 in an upward direction. It is noted that the diameter of this collar is preferably slightly less than the diameter of the units of packing material. A gasket 33 is mounted between the upper end of the annular member 31 and the adjacent surfaces of cap and cup.

Figure 2:
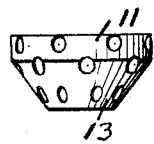
Fig. 2 is a view of the outer face of one of the units of packing material.
Figure 3:
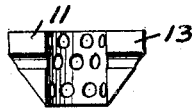
Fig. 3 is a corresponding view of the inner face of the unit.
Figure 4:
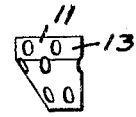
Fig. 4 is a view of the right side of Fig. 3.

The packing material is preferably of soft metal. As shown in Figs. 2, 3 and 4 this metal is perforated at intervals by apertures 27, which in the embodiment herein shown extend entirely through the material in a substantially radial direction.

In service the packing is forced upwardly toward the base of the cup 9, and presses tightly against the piston rod and cup, effectively preventing escape of fluid from within the cylinder, notwithstanding vibration of the cup 9 in the box 7 due to slight irregularities in the movement of the piston rod or due to other causes. It is intended that the packing shall gradually compress in service, the apertures 27 being thus gradually reduced in size. This compression allows the packing material to adapt itself continually to the several surfaces with which it contacts, and to change its own shape when required due to any changes in the contour or relative positions of such surfaces; and this adaptation takes place automatically and causes no tendency of the packing or its associated parts to permit the fluid in the cylinder to leak.

Experience has shown that one set of packing in active service for several months was in good condition at the end of that time, with the apertures 27 still averaging roughly one-half their original size.

When the apertures 27 have been reduced to a small fraction of their original size, the packing material may be readily replaced by simply removing the cap 29 and with it the cup 9, taking out the worn packing material, inserting new material, fitting the cup thereon, and securing the cap in position on the cylinder head.

It is understod that the axial length of the cup is less than the axial length of the recess in which it is mounted, leaving a clearance that permits vibration of the cup so that the cup and the packing mounted therein accommodate themselves to any irregularities in the movement of the piston.

In view of the above, it will be seen that the several objects of the invention are achieved and other advantageous results attained.

As many changes could be made in carrying out the above constructions without departing from the scope of the invention, it is intended that all matter contained in the above description or shown in the accompanying drawings shall be interpreted as illustrative and not in a limiting sense.

I claim:

1. In apparatus of the class described, in combination, a piston rod, a cylinder head through which the rod passes, an annular member upon the head around the rod, a cap on said annular member, a vibrating cup loosely mounted within said cap, compressible packing material therein provided with apertures adapted to be compressed automatically during service, the packing material being subject to pressure of fluid from within the cylinder.

2. In apparatus of the class described, in combination, a piston rod, a cylinder head through which the rod passes, an annular member upon the head around the rod, a cap threaded on said annular member, a vibrating cup loosely mounted within said cap, compressible packing material therein provided with a plurality of apertures extending entirely through such material and adapted to be automatically compressed during service, a compression spring bearing against the packing material, the packing material being subject to pressure of fluid from within the cylinder.

3. In apparatus of the class described, in combination, a piston rod, a cylinder head through which the rod passes, an annular member threaded upon the head around the rod, a cap threaded on said annular member, a vibrating cup loosely mounted within said cap and having a recess with a conical surface, compressible packing material therein, comprising one or more soft metal units each provided with a plurality of substantially radial apertures extending entirely through such material and adapted to be automatically compressed during service, a compression spring within the annular member and having one end seated against said member, a collar forming a seat for the other end of the spring and bearing against the packing material, the latter collar being subject to pressure of fluid from within the cylinder.

4. Compressible packing material comprising one or more soft metal units each provided with a plurality of apertures adapted to be automatically compressed during service.

5. Compressible packing material comprising one or more soft metal units each provided with a plurality of apertures extending entirely through such material and adapted to be automatically compressed during service.

6. Compressible packing material comprising a pair of soft metal units each provided with a plurality of substantially radial apertures extending entirely through such material and adapted to be automatically compressed during service.

In testimony whereof, I have signed my name to this specification this 22d day of November, 1920.

SCHUYLER A. SMITH.